(12) United States Patent
Okamura

(10) Patent No.: US 9,030,681 B2
(45) Date of Patent: May 12, 2015

(54) METHODS AND DEVICES FOR IDENTIFYING DEVICES COUPLED TO A DATA PROCESSING APPARATUS

(71) Applicant: Seiko Epson Corporation, Tokyo (JP)

(72) Inventor: Yukio Okamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 156 days.

(21) Appl. No.: 13/719,317

(22) Filed: Dec. 19, 2012

(65) Prior Publication Data

US 2013/0155439 A1 Jun. 20, 2013

(30) Foreign Application Priority Data

Dec. 19, 2011 (JP) .................... 2011-276958

(51) Int. Cl.
  *G06F 3/12* (2006.01)
  *H04N 1/00* (2006.01)

(52) U.S. Cl.
  CPC ........ *H04N 1/00278* (2013.01); *H04N 1/00541* (2013.01); *H04N 1/0083* (2013.01); *H04N 2201/0094* (2013.01)

(58) Field of Classification Search
  CPC ........................ H04N 1/0083; H04N 1/00541
  See application file for complete search history.

(56) References Cited

U.S. PATENT DOCUMENTS

| 5,602,650 | A  | * | 2/1997 | Tamura et al. ................ 358/400 |
| 6,894,501 | B1 | * | 5/2005 | Flasck et al. ................. 324/416 |
| 7,236,022 | B2 | * | 6/2007 | Tai et al. ..................... 327/142 |
| 7,486,321 | B2 |   | 2/2009 | Ikeno et al. |
| 7,697,047 | B2 |   | 4/2010 | Kato et al. |
| 7,960,985 | B2 | * | 6/2011 | Wong et al. ................. 324/750.3 |
| 7,979,224 | B2 | * | 7/2011 | Sutardja ......................... 702/65 |
| 2004/0207864 | A1 | * | 10/2004 | Combs et al. ................ 358/1.13 |

FOREIGN PATENT DOCUMENTS

| JP | 2000-010803 A | 1/2000 |
| JP | 2004-112729 A | 4/2004 |
| JP | 3807382 B2    | 8/2006 |
| JP | 3975964 B2    | 9/2007 |

* cited by examiner

*Primary Examiner* — Paul F Payer

(74) *Attorney, Agent, or Firm* — Nutter McClennen & Fish LLP; John J. Penny, Jr.

(57) ABSTRACT

A scanner unit changes a first wire included in a pair of wires in Low condition into High condition, sets another second wire in Low condition during the change, and identifies whether a CISM coupled with a resistor is or a CISM coupled with no resistor is by inputting a signal from the second wire afterward. Further, the controller changes the first wire in High condition into Low condition, sets the second wire in High condition during the change, and identifies the CISM by inputting a signal from the second wire. The scanner unit sets the second wire in condition before being changed while changing condition of the first wire so as to prevent an effect of a signal (crosstalk) caused when the condition of the first wire is changed more effectively.

6 Claims, 6 Drawing Sheets

METHODS AND DEVICES FOR IDENTIFYING DEVICES COUPLED TO A DATA PROCESSING APPARATUS

CROSS REFERENCES TO RELATED APPLICATIONS

The entire disclosure of Japanese Patent Application No. 2011-276958, filed Dec. 19, 2011 is expressly incorporated by reference herein.

BACKGROUND

1. Technical Field

The present invention relates to a data processing apparatus and a data processing method, and more specifically, to a data processing apparatus which identifies a device coupled therewith and a data processing method.

2. Related Art

As an ordinary data processing apparatus of this kind, a cable identifying device to be coupled with cables for distribution in order in a case where a plurality of boosters having different values of resistors for identification is installed which checks booster numbers has been proposed, e.g., as disclosed in JP-A-2004-112729. As for this apparatus, if a cable for distribution is coupled with a measurement terminal of the cable identifying device, a resistor for identification of a booster coupled with the cable for distribution is connected to a reference resistor for measurement of the cable identifying device in series, and a voltage of a power supply unit is divided and provided to an A/D converter. The apparatus identifies the booster by checking digital data into which the divided voltage is converted by the A/D converter.

Incidentally, the apparatus described above identifies a booster (coupled device) having a different value of the resistor for identification. In some cases, e.g., it is desirable to distinguish a coupled device having a resistor from a coupled device having no resistor. A method for identifying a coupled device more exactly in such a case has been desired.

SUMMARY

An advantage of some aspects of the invention is that a data processing device which can identify a coupled device more exactly and a data processing method are provided.

The invention is formed by following schemes adopted to achieve the main objective described above.

The data processing apparatus of the invention is a data processing apparatus which identifies a coupled device. The data processing apparatus includes a controller and at least a pair of wires whose one end is coupled with the controller. One of a coupled device having at least a pair of signal lines and a resistor is coupled with the pair of signal lines and a coupled device having at least a pair of signal lines and no resistor is coupled with the pair of signal lines is coupled with another end of the wires. The controller is configured to change one of the pair of wires in fist condition into second condition, the controller being configured to set another one of the pair of wires into the first condition during the change, the controller being configured to identify the coupled device by inputting a signal from the other one of the wires afterward.

As for the data processing apparatus, one of a coupled device having at least a pair of signal lines and a resistor is coupled with the pair of signal lines and a coupled device having at least a pair of signal lines and no resistor is coupled with the pair of signal lines is coupled with another end of the wires. One of the pair of wires in fist condition is changed into second condition. Another one of the pair of wires is set into the first condition during the change. A signal is inputted from the other one of the wires so that the coupled device is identified afterward. For instance, if one of the wires of a coupled device coupled with a resistor is in the second condition, the other of the wires is in the second condition as well. Even if one of the wires of a coupled device coupled with no resistor is in the second condition, the other of the wires remains in the first condition. Thus, the coupled device can be identified on the basis of the condition of the respective wires. It is generally known that a change in condition of one of a pair of wires may cause so called crosstalk which affects the other in some cases. Even if identification of the coupled device is attempted depending upon an output from the wire in such a case, the coupled device may possibly be erroneously detected. It is practical here to set the other wire into the condition before being changed while the condition of the one wire is being changed so that an effect of a signal caused when the condition of the one wire is changed can be prevented more effectively. The coupled device can thereby be identified more exactly.

The controller of the data processing apparatus of the invention may repeat a process for changing one of the pair of wires in first condition into second condition, setting another one of the pair of wires in the first condition during the change and inputting a signal from the other wire afterward and a process for changing one of the pair of wires in second condition into first condition, setting another one of the pair of wires in the second condition during the change and inputting a signal from the other wire afterward, and may identify the coupled device on the basis of the signal inputted from the other wire. As the controller practices the first condition and the second condition repeatedly in this way and obtains the input signal repeatedly, the coupled device can be identified more exactly.

As for the data processing apparatus of the invention, the coupled device may be a reading device which reads an image.

The controller of the data processing apparatus of the invention may carry out a process for identifying the coupled device upon being powered on, and may carry out control of a coupled device by using a result of the identification. The data processing apparatus can carry out a process on the coupled device by using the information in identification of the coupled device after being powered on.

The controller of the data processing apparatus of the invention may provide the one of the wires with a High signal in the first condition and provide the other of the wires with a Low signal in the second condition, or wherein the controller may provide the one of the wires with a Low signal in the first condition and provide the other of the wires with a High signal in the second condition. The coupled device can be identified more exactly by the use of the High signal and the Low signal in this way.

Incidentally, when the data processing apparatus of the invention identifies the coupled device by inputting a signal from the other wire, the controller may identify the coupled device by inputting a signal from the other wire a particular period of time after setting the other of the pair of wires in the first condition. The "particular period of time" may be empirically specified in accordance with a change in voltage on the other wire, e.g., a period of time where the coupled device is identified exactly enough. Meanwhile, the controller may identify the coupled device by inputting a signal from the other wire immediately before changing the condition of the one of the pair of wires after setting the other wire in the pair of wires into the first condition.

The data processing method of the invention is a data processing method to be practiced by a data processing apparatus having a controller and at least a pair of wires whose one end is coupled with the controller. Another end of the wires is coupled with one of a coupled device having at least a pair of signal lines and a resistor is coupled with the pair of signal lines and a coupled device having at least a pair of signal lines and no resistor is coupled with the pair of signal lines. The method for identifying the coupled device includes changing one of the pair of wires in fist condition into second condition, setting another one of the pair of wires into the first condition during the change, and identifying the coupled device by inputting a signal from the other one of the wires afterward.

The data processing method is to set the other wire into condition before being changed while changing condition of the one wire and reduce an effect of a signal caused when the condition of the one wire is changed more effectively similarly as the data processing apparatus described above, so that the coupled device can be identified more exactly. Various forms of the data processing apparatus described above may be employed for the data processing method. Further, a step for achieving respective functions of the data processing apparatus described above may be added.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
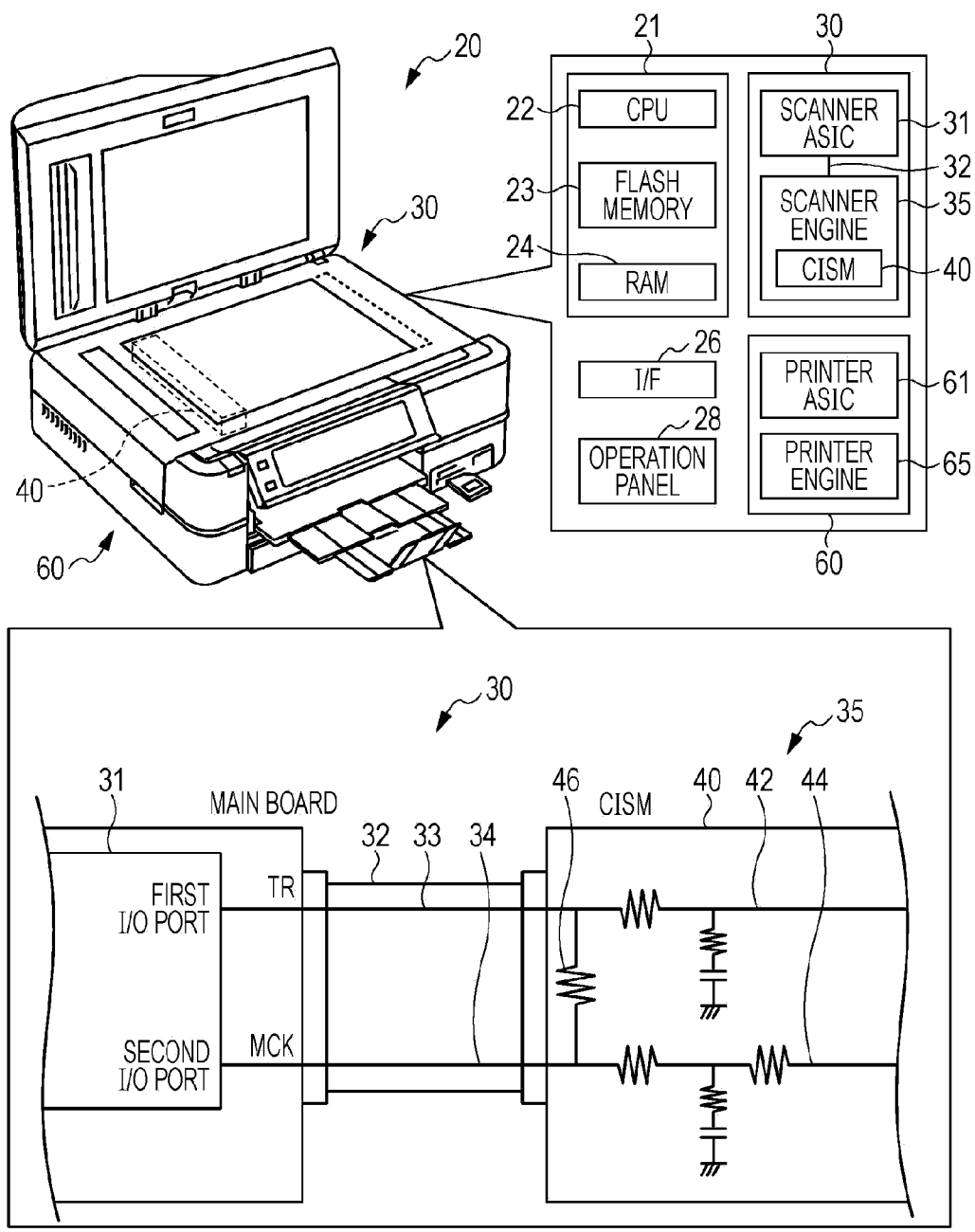
FIG. 1 is a structural diagram which shows an outline of a structure of a multifunction printer.
Figure 2:
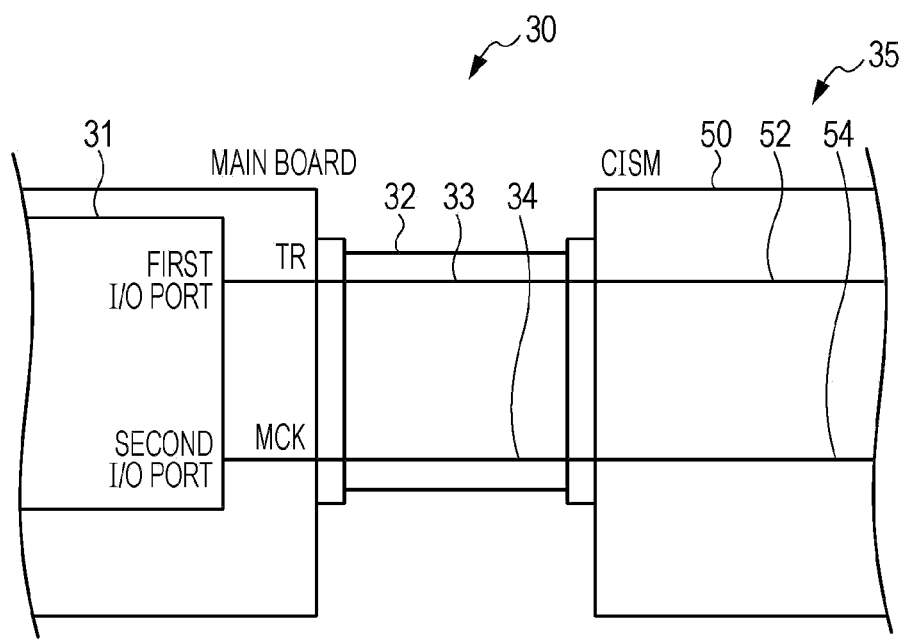
FIG. 2 is structural diagram which shows an outline of a structure of a CISM.

Then, an embodiment of the invention will be explained with the drawings. FIG. 1 is a structural diagram which shows an outline of a structure of a multifunction printer 20, i.e., an embodiment of the invention. FIG. 2 is a structural diagram which shows an outline of a structure of a CISM 50. The multifunction printer 20 of the embodiment has a controller 21 which entirely controls the apparatus, a network interface (I/F) 26 which performs communication with an external device, an operation panel 28 which has monitor and operation sections and can be variously operated by a user, a scanner unit 30 which optically reads a manuscript and produces image data and a printer unit 60 which prints an image on printing material.

The controller 21 is formed as a microprocessor centered around a CPU 22, and has a flash memory 23 in which various data processing programs, various data, various tables, etc., are stored, and a RAM 24 in which scan data or printing data is temporarily stored. The controller 21 inputs various kinds of operation signals or various kinds of detected signals from the scanner unit 30 or the printer unit 60, or inputs an operation signal generated in response to a touch operation done on the operation panel 28. Further, the controller 21 gives the scanner unit 30 instructions to read a manuscript as image data on the basis of scanning instructions coming from the operation panel 28, or gives the printer unit 60 instructions to print image data.

The scanner unit 30 includes a scanner ASIC 31 as a controller of the invention and a scanner engine 35 having a contact image sensor module (CISM) 40, etc. The scanner ASIC 31 is an integrated circuit which controls the scanner engine 35. Upon receiving scanning instructions from the controller 21, the scanner ASIC 31 controls the scanner engine 35 so as to read a manuscript as image data. The scanner ASIC 31 is coupled with the CISM 40 via a cable 32. The scanner ASIC 31 has a first I/O port which outputs a control signal TR, etc., and a second I/O port which outputs a main clock MCK, etc. The first and second I/O ports are coupled with a first wire 33 and a second wire 34, both included in the cable 32, respectively. Further, the scanner ASIC 31 has a function described later in detail to carry out an identifying process for identifying whether what is coupled with the cable 32 is the CISM 40 having a resistor 46 or a CISM 50 having no resistor.

The scanner engine 35 is provided with a flatbed section having a glass plate including a manuscript reading area, an automatic document feeder (ADF) unit which automatically feeds the manuscript reading area with a manuscript and the CISM 40 which moves back and forth on the manuscript reading area as driven by a carriage motor. The CISM 40 is equipped with a light source unit having LEDs of respective colors which each emit red, green and blue light which illuminates the manuscript reading area and a CIS which reads a manuscript by receiving light reflected on the manuscript and stores the received light in a form of electric charges. The CISM 40 has a first signal line 42, a second signal line 44 and a resistor 46 coupled with and between the first and second signal lines 42 and 44. The CISM 40 inputs the control signal TR via the first signal line 42 coupled with the first wire 33, and inputs the main clock MCK via the second signal line 44 coupled with the second wire 34. Further, the scanner unit 30 in the multifunction printer 20 is coupled with the CISM 40 having the resistor 46 in one case and with the CISM 50 having no resistor 46 as shown in FIG. 2 in another case, depending upon the apparatus. The CISM 50 has a first signal line 52 and a second signal line 54, and no resistor is coupled between the first and second signal lines 52 and 54. The CISM 50 inputs the control signal TR via the first signal line 52 coupled with the first wire 33, and inputs the main clock MCK via the second signal line 54 coupled with the second wire 34. As for the scanner unit 30, a pair of the wires 33 and 34 that the cable 32 includes is coupled with one of the CISM 40 having at least a pair of the signal lines 42 and 44 with which the resistor 46 is coupled and the CISM 50 having at least a pair of the signal lines 52 and 54 with which no resistor is coupled on another end in this way.

The printer unit 60 has a printer ASIC 61 and a printer engine 65 as shown in FIG. 1. The printer ASIC 61 is an integrated circuit which controls the printer engine 65. Upon receiving instructions to print from the controller 21, the printer ASIC 61 controls the printer engine 65 so as to print an image on printing material on the basis of an image file to be an object of the instructions to print. The printer engine 65 is formed as a color printer mechanism of a known ink jet system to carry out printing by emitting ink from a printing head onto a sheet of paper. Incidentally, the printer unit 60 is omitted to be explained in detail as it is not included in the scope of the invention.

Figure 3:
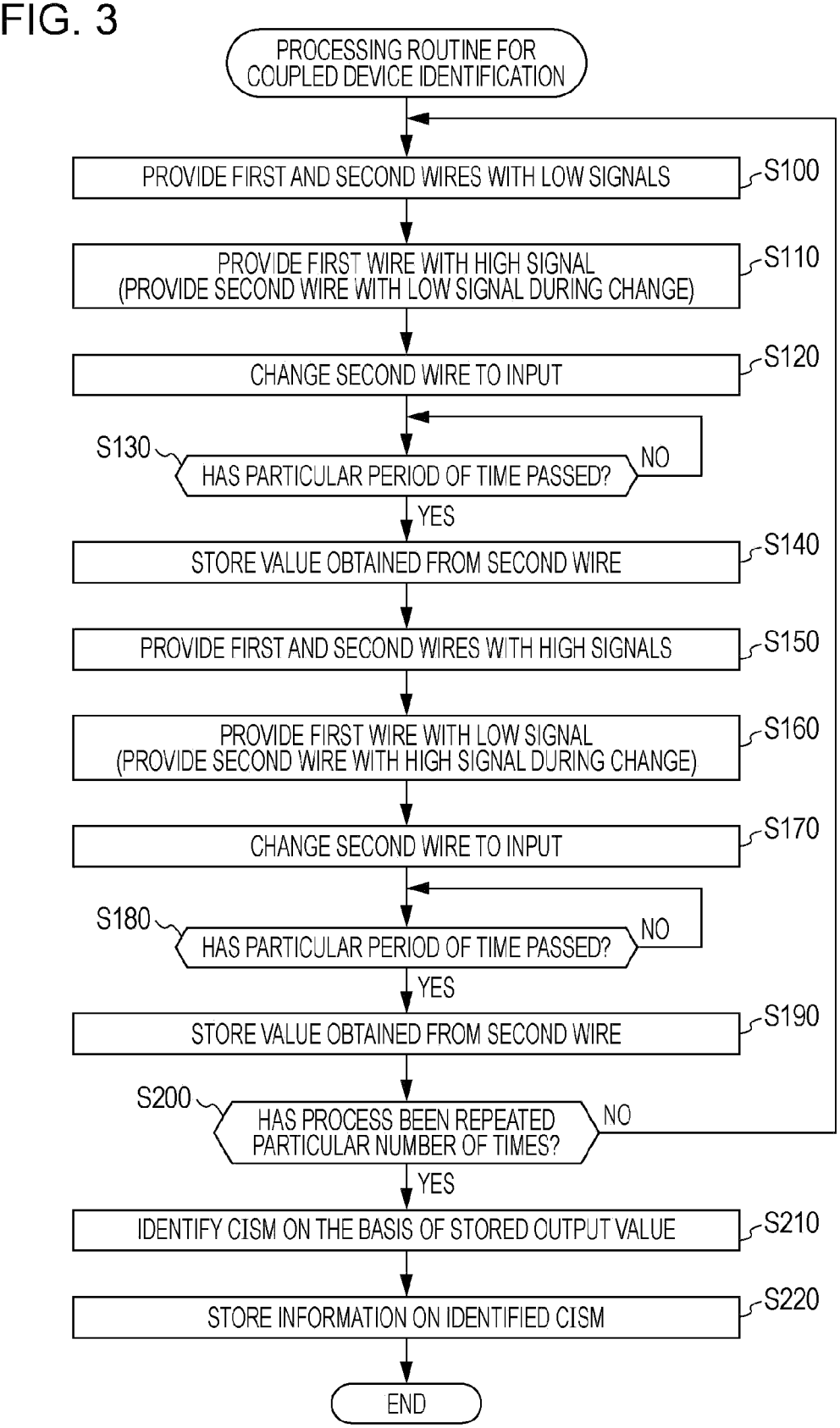
FIG. 3 is a flowchart which shows an exemplary processing routine for identifying a coupled device.

Then, an operation of the multifunction printer 20 of the embodiment structured in this way, specifically a process for identifying whether what is coupled with the scanner ASIC 31 is the CISM 40 or the CISM 50, will be explained. FIG. 3 is a flowchart which shows an exemplary processing routine for coupled device identification to be carried out by the scanner ASIC 31. The routine is stored in the scanner ASIC 31 and is carried out, e.g., if a power switch put on the operation panel 28 of the multifunction printer 20 is pressed and the printer is powered on. The processing routine for coupled device identification will be explained on a basic assumption that the first I/O port coupled with the first wire 33 and the second I/O port coupled with the second wire 34 are an output port and an input port, respectively, and that a process for identifying the CISM in accordance with an input value coming from the second wire 34 if the first wire 33 is provided with a signal is carried out.

If the routine is carried out, the scanner ASIC 31 makes the first I/O port an output port and provides the first wire 33 with a particular Low signal, and makes the second I/O port an output port and provides the second wire 34 with a particular Low signal (step S100). Then, the scanner ASIC 31 provides the first wire 33 with a particular High signal, and provides the second wire 34 with a Low signal in a period of time of the change of the signal level on the first wire 33 from Low to High (step S110). Suppose that the period of time of the change includes part of the period of time of the Low signal before the first wire 33 is changed over to the High signal, the period of time of the change from the Low signal to the High signal, and part of the period of time of the High signal after the first wire 33 is changed over to the High signal. Then, change over the second I/O port coupled with the second wire 34 to an input port (step S120), and wait until a particular period of time passes (step S130). The particular period of time may be empirically specified in accordance with a change in voltage on the side of the second wire 34, e.g., a period of time where the CISM is identified exactly enough. If the particular period of time passes at the step S130, store the value obtained from the second wire 34 (step S140).

Then, the scanner ASIC 31 provides the first wire 33 with a High signal via the first I/O port, makes the second I/O port an output port and provides the second wire 34 with a High signal (step S150). Then, the scanner ASIC 31 provides the first wire 33 with a Low signal, and provides the second wire 34 with a High signal in a period of time of the change of the signal level on the first wire 33 from High to Low (step S160). Suppose that the period of time of the change includes part of the period of time of the High signal before the first wire 33 is changed over to the Low signal, the period of time of the change from the High signal to the Low signal, and part of the period of time of the Low signal after the first wire 33 is changed over to the Low signal. Then, change over the second I/O port to an input port (step S170), and wait until a particular period of time passes (step S180). If the particular period of time passes, store the value obtained from the second wire 34 (step S190).

Then, the scanner ASIC 31 decides whether the above process (for storing the input value) is repeated a particular number of times (step S200). Before the above process is repeated the particular number of times, the scanner ASIC 31 carries out the process of and following the step S100. The particular number of times can be empirically set in accordance with, e.g., how exactly the CISM is identified, and can be twice, thrice, etc. If the above process is repeated the particular number of times at the step S200, meanwhile, the scanner ASIC 31 identifies whether the coupled device is the CISM 40 or the CISM 50 on the basis of the stored value (step S210), stores information on the identified CISM in a particular area of the RAM 24 (step S220), and ends the routine. As the CISM 40 coupled with the resistor 46 causes the first and second wires 33 and 34 to be given a same voltage level, and the CISM 50 coupled with no resistor causes the first and second wires 33 and 34 to be given different voltage levels, the CISM can thereby be identified. Incidentally, the ASIC 31 may identify the CISM 40 if the input value is given High, Low, High, Low levels, and may identify the CISM 50 otherwise at the step S210. Then, upon being instructed to read a manuscript afterward, the scanner unit 30 sets the control signal TR and the main clock MCK coming from the scanner ASIC 31, and the scanner ASIC 31 controls the scanner engine 35 so as to carry out a process for reading the manuscript.

Figure 4:
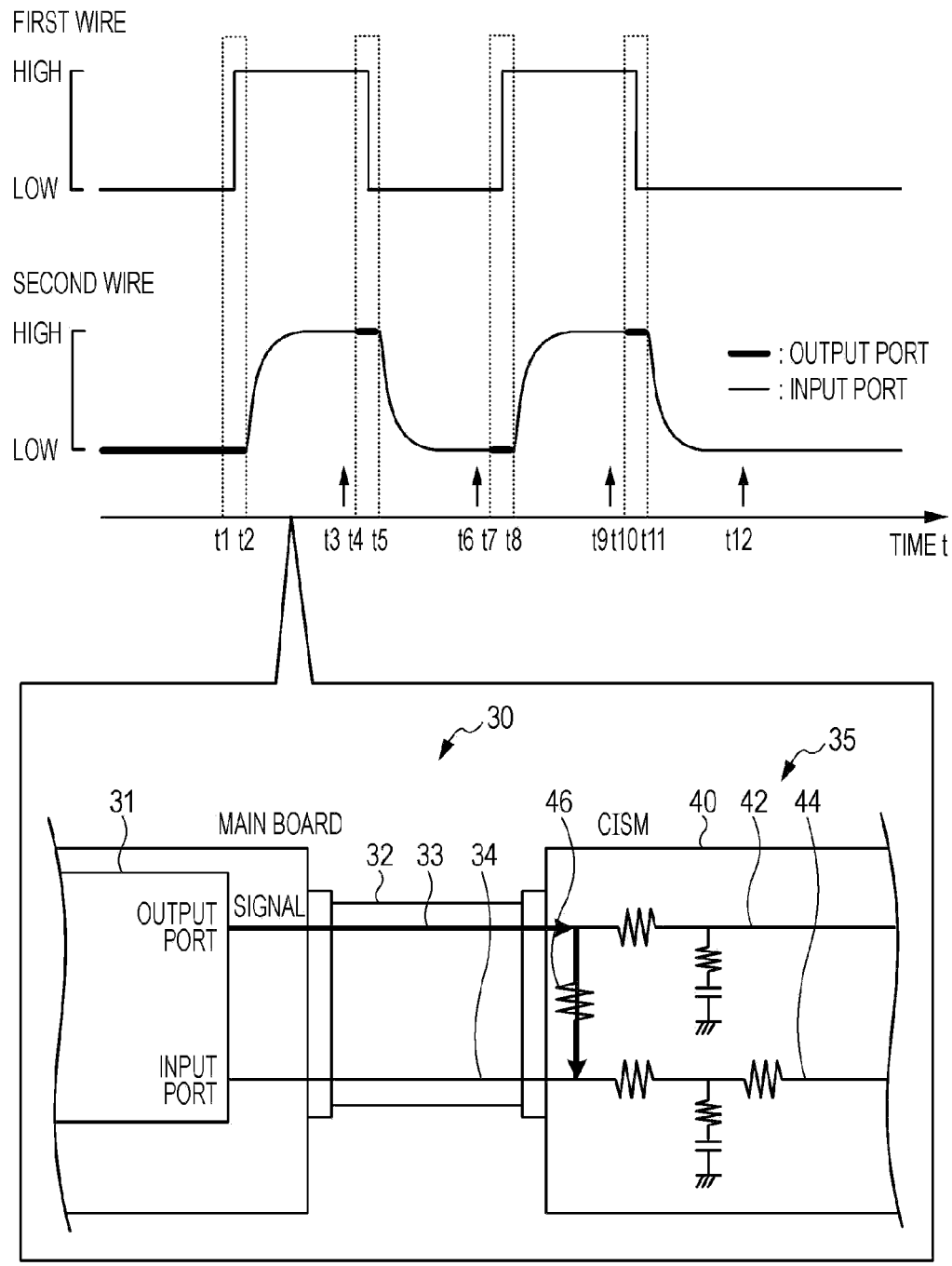
FIG. 4 is an explanatory diagram of an indentifying process with a CISM having a resistor.
Figure 5:
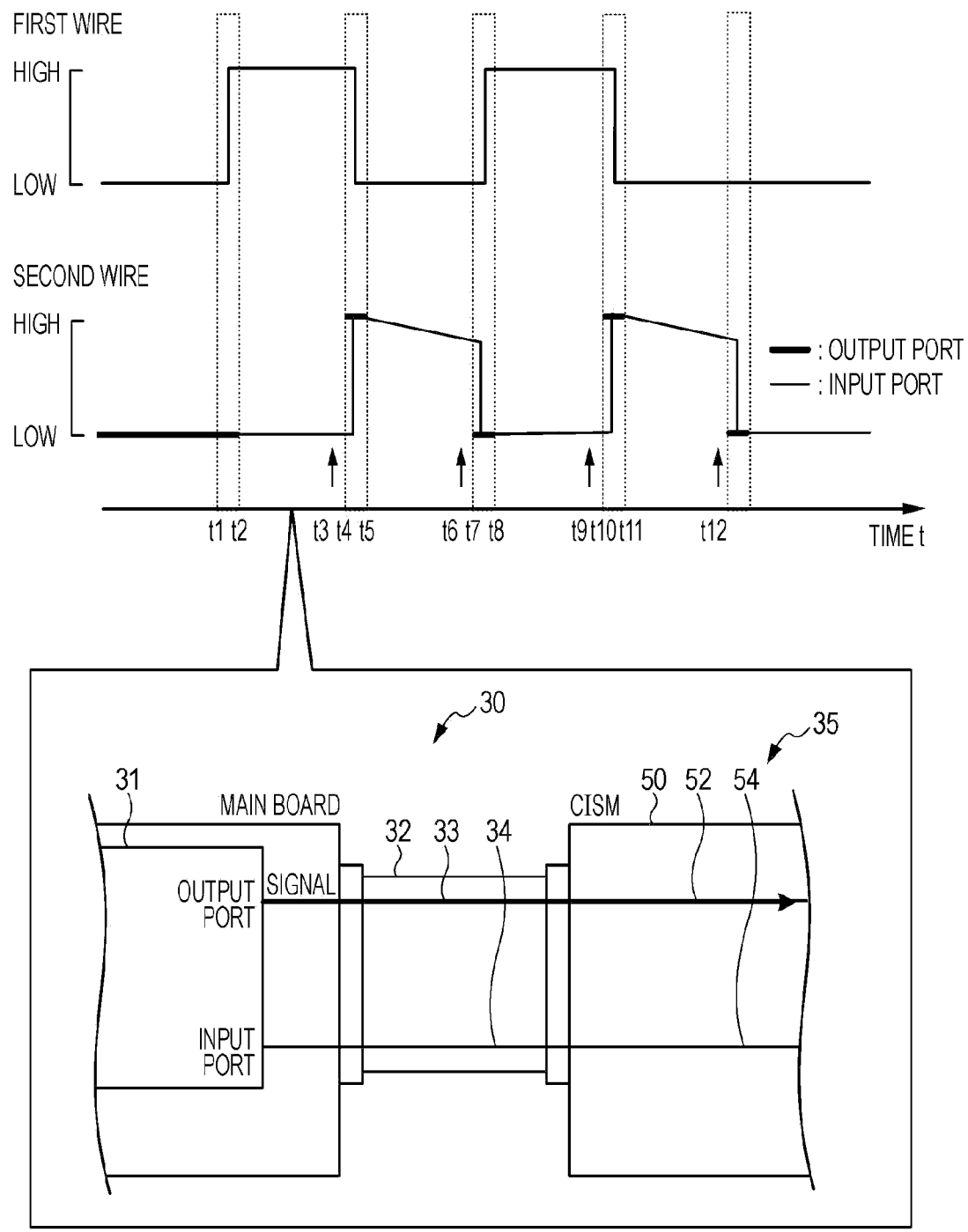
FIG. 5 is an explanatory diagram of an indentifying process with a CISM having no resistor.
Figure 6:
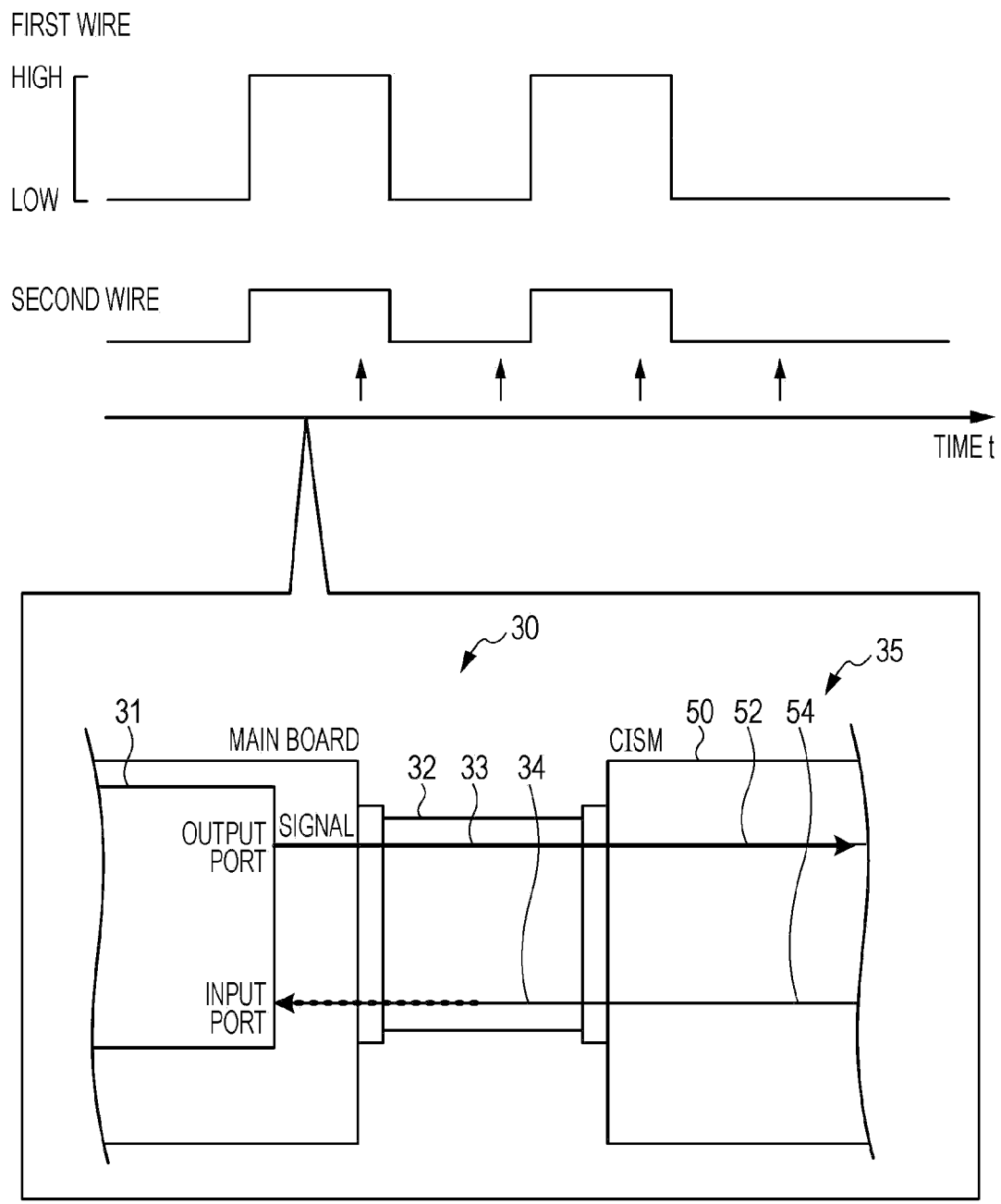
FIG. 6 illustrates crosstalk caused when a first wire is provided with a signal.

Temporal conditions of the first wire 33 and the second wire 34 in the above identifying process will be specifically explained here. FIG. 4 illustrates the identifying process for identifying the CISM 40 having the resistor 46. FIG. 5 illustrates the identifying process for identifying the CISM 50 having no resistor. Further, FIG. 6 illustrates crosstalk caused upon the first wire being provided with a signal. Suppose that the first I/O port coupled with the first wire 33 and the second I/O port coupled with the second wire 34 are output and input ports, respectively, and that the CISM is identified in accordance with the input value coming from the second wire 34 upon the first wire 33 being provided with a signal. In that case, as shown in FIG. 6, a change in the voltage condition on the one first wire 33 may sometimes affect the other second wire 34, which is so called crosstalk. Even if identification of the coupled device is attempted depending upon the input value coming from the second wire 34 in such a case, the coupled device may possibly be erroneously detected. Accordingly, the scanner unit 30 carries out the process for identifying the CISM described above.

To begin with, the process for coupled device identification will be explained in a case where the scanner ASIC 31 is coupled with the CISM 40 as shown in FIG. 4. After providing the first wire 33 and the second wire 34 with Low signals at the step S100, the scanner ASIC 31 provides the second wire 34 with a Low signal at the step S110 in the period of time of the change of the signal level on the first wire 33 from Low to High (time t1-t2). In this way, the change in the voltage level on the side of the second wire 34 possibly caused by the change in the voltage level on the side of the first wire 33 can be controlled. Then, the side of the second wire 34 is made an input port (time t2), and the scanner ASIC 31 obtains an input value coming from the second wire 34 at the step S140 (time t3) after a particular period of time passes. If the resistor 46 is coupled parallel with the signal lines, the voltage level on the side of the second wire 34 equals the voltage level on the side of the first wire 33 after the particular period of time passes. The CISM 40 having the resistor 46 can be identified owing to the voltage level. Then, after providing the first wire 33 and the second wire 34 with High signals at the step S150, the scanner ASIC 31 provides the second wire 34 with a High signal at the step S160 in a period of time of the change of the signal level on the first wire 33 from High to Low (time t4-t5). In this way, the change in the voltage level on the side of the second wire 34 possibly caused by the change in the voltage level on the side of the first wire 33 can be controlled. Then, the side of the second wire 34 is made an input port (time t5), and the scanner ASIC 31 obtains an input value coming from the second wire 34 at the step S190 (time t6) after a particular period of time passes. If the resistor 46 is coupled parallel with the signal lines, the voltage level on the side of the second wire 34 equals the voltage level on the side of the first wire 33 after the particular period of time passes. The CISM 40 having the resistor 46 can be identified owing to the voltage level. Then, the scanner ASIC 31 carries out the same process as described above (time t7-t12), and can identify the CISM 40 as being coupled with the scanner ASIC 31.

Then, the process for coupled device identification will be explained in a case where the scanner ASIC 31 is coupled with the CISM 50 as shown in FIG. 5. After providing the first wire 33 and the second wire 34 with Low signals at the step S100, the scanner ASIC 31 provides the second wire 34 with a Low signal at the step S110 in the period of time of the change of the signal level on the first wire 33 from Low to High (time t1-t2). In this way, the change in the voltage level on the side of the second wire 34 possibly caused by the change in the voltage level on the side of the first wire 33 can be controlled. Then, the side of the second wire 34 is made an input port (time t2), and the scanner ASIC 31 obtains an input value coming from the second wire 34 at the step S140 (time t3) after a particular period of time passes. If no resistor is coupled parallel with the signal lines, the voltage level on the side of the second wire 34 does not change from an earlier output voltage level even after a particular period of time passes. The CISM 50 having no resistor can be identified owing to the voltage level. Then, after providing the first wire 33 and the second wire 34 with High signals at the step S150, the scanner ASIC 31 provides the second wire 34 with a High signal at the step S160 in a period of time of the change of the signal level on the first wire 33 from High to Low (time t4-t5). In this way, the first wire 33 and the second wire 34 are given a same voltage level, and the change in the voltage level on the side of the second wire 34 possibly caused by the change in the voltage level on the side of the first wire 33 can be controlled. Then, the side of the second wire 34 is made an input port (time t5), and the scanner ASIC 31 obtains an input value coming from the second wire 34 at the step S190 (time t6) after a particular period of time passes. If no resistor is coupled parallel with the signal lines, the voltage level does not change much from an earlier output voltage level even after a particular period of time passes. The CISM 50 having no resistor can be identified owing to the voltage level. Then, the scanner ASIC 31 carries out the same process as described above (time t7-t12), and can identify the CISM 50 as being coupled with the scanner ASIC 31.

The relationship in which the elements of the embodiment correspond to elements of the invention will be made clear at this point. The scanner ASIC 31 of the embodiment corresponds to the controller of the invention. The first wire 33 and the second wire 34 correspond to the pair of wires. The CISM 40 and the CISM 50 correspond to the coupled device and the reading device, respectively. Incidentally, an operation of the scanner unit 30 of the embodiment is explained so that an exemplary method for data processing of the invention is made clear.

The scanner unit 30 of the embodiment described above in detail changes the condition of the first wire 33 included in the pair of wires from the Low condition to the High condition, keeps the other second wire 34 in the Low condition during the change, and then inputs a signal coming from the second wire 34 so as to identify the CISM (identifying process). Further, the scanner unit 30 changes the condition of the first wire 33 from the High condition to the Low condition, keeps the second wire 34 in the High condition during the change, and then inputs a signal coming from the second wire 34 so as to identify the CISM (identifying process). The scanner unit 30 keeps the second wire 34 in the condition before the change in this way while changing the condition of the first wire 33 so that an effect of a signal (crosstalk) caused when the condition of the first wire 33 is changed can be reduced more and the coupled CISM can be identified more exactly. Further, as carrying out the above identifying process repeatedly, the scanner unit 30 can obtain an input signal repeatedly and identify the coupled CISM further more exactly. Further, as carrying out the above identifying process after being powered on, the scanner unit 30 can carry out a process on the CISM by using information in identifying the coupled device. Still further, the scanner unit 30 can identify the coupled CISM more exactly by using the High and Low signals.

Incidentally, the invention is not limited to the embodiment described above at all, and it goes without saying that the invention can be practiced in various ways as long as remaining within the scope of the invention.

Although, e.g., it is supposed as to the embodiment that the identifying process accompanied by the change from Low to High on the first wire 33 and the identifying process accompanied by the change from High to Low on the first wire 33 are carried out repeatedly, the invention is not limited to the above as long as the identifying process is carried out at least once and over. Even in this way, the coupled CISM can be identified more exactly.

Although it is supposed as to the embodiment that the processing routine for coupled device identification is carried out when the apparatus is powered on, the timing of carrying out the processing routine for coupled device identification is not limited to that in particular. The processing routine may be carried out, e.g., before the image reading process of the scanner unit 30. The processing routine may be carried out only when the apparatus is initially powered on and a result of the identification may be stored in a non-volatile storage device (flash memory 23, etc.).

The conditions on the first wire 33 and the second wire 34 are changed by means of outputs of the High and Low signals according to the embodiment described above. What changes the conditions on the first wire 33 (or first signal line 42) and the second wire 34 (or second signal line 44) is not limited to these signals in particular, though.

According to the embodiment described above, the CISM (coupled device) is identified by means of the input of a signal from the second wire 34 after a particular period of time passes after the second wire 34 is put into the same condition as that of the first wire 33. The invention is not limited to the above in particular. The CISM may be identified, e.g., by means of the input of a signal from the second wire 34 after the second wire 34 is put into the same condition as that of the first wire 33 and immediately before the condition of the first wire 33 is changed. The coupled CISM can be identified more exactly in this way, as well.

According to the embodiment described above, the cable 32 is explained as having the pair of the first and second wires 33 and 34. The structure is not limited to the one having a pair of wires in particular, and may be the scanner ASIC and CISM coupled with three wires or four or more wires as long as including a resistor connected parallel.

Although the embodiment described above is explained as the multifunction printer 20, another embodiment is not limited in particular as long as being a scanner unit coupled with the CISM 40 coupled with the resistor 46 and the CISM 50, and may be a scanner device lacking the printer unit 60 or a facsimile device having a facsimile function. Further, another embodiment is not limited to a scanner unit in particular as long as being a data processing apparatus coupled with either one of a coupled device in which a pair of signal lines are coupled with a resistor and a coupled device in which a pair of signal lines are coupled with no resistor. Still further, although it is supposed that the printer unit 60 is a color printer mechanism of an ink jet system, the printer unit 60 is not limited to that in particular and may be a color printer of an electrophotography system, a color printer of a dot impact system or a monochrome printer of these systems.

Although being explained as the multifunction printer 20, the embodiment described above may be practiced as a data processing method or a program which practices the method.

What is claimed is:

1. A data processing apparatus comprising:
    a controller; and
    at least a pair of wires having a first end that is coupled with the controller and a second end that is coupled with one of a first coupled device having at least a pair of signal lines and a resistor that is coupled with the pair of signal lines and a second coupled device having at least a pair of signal lines but no resistor that is coupled with the pair of signal lines, and wherein
    the controller is configured to change a first wire of the pair of wires in a first condition into a second condition, to set a second wire ene of the pair of wires into the first condition during the change, and to identify the first or the second coupled device by inputting a first signal from the second wire after the change.

2. The data processing apparatus according to claim 1, wherein the controller repeats the process for changing the first wire in the first condition into the second condition, setting the second wire into the first condition during the change and inputting the first signal from the second wire and a process for changing the first wire in the second condition into the first condition, setting the second wire into the second condition during the change and inputting a second signal from the second wire after the change, and identifies one of the first and second coupled devices on the basis of the first and second signals inputted from the second wire.

3. The data processing apparatus according to claim 2, wherein at least one of the first and second coupled devices is a reading device which reads an image.

4. The data processing apparatus according to claim 1, wherein the controller carries out a process for identifying the first or the second coupled device upon being powered on, and the controller carries out control of the identified coupled device using the result of the identification.

5. The data processing apparatus according to claim 1, wherein the controller provides the first wire with a High signal in the first condition and provides the second wire with a Low signal in the second condition, or wherein the controller provides the first wire with a Low signal in the first condition and provides the first wire and the second wire with a High signal in the second condition.

6. A data processing method to be practiced by a data processing apparatus having a controller and at least a pair of wires having a first end that is coupled with the controller, a second end that is coupled with one of a first coupled device having at least a pair of signal lines and a resistor that is coupled with the pair of signal lines and a second coupled device having at least a pair of signal lines but no resistor that is coupled with the pair of signal lines, the method comprising:
    changing a first wire of the pair of wires in a first condition into a second condition;
    setting a second wire of the pair of wires into the first condition during the change, and
    identifying the first or the second coupled device by inputting a signal from the second wire after the change.

* * * * *